(12) United States Patent
Stokkan et al.

(10) Patent No.: US 7,447,668 B2
(45) Date of Patent: Nov. 4, 2008

(54) MATCH NETWORK CONSTRUCTION

(75) Inventors: Solve Stokkan, Ski (NO); Stephen Haler, Coeur d'Alene, ID (US)

(73) Assignee: TriGeo Network Security, Inc., Post Falls, ID (US)

( * ) Notice: Subject to any disclaimer, the term of this patent is extended or adjusted under 35 U.S.C. 154(b) by 241 days.

(21) Appl. No.: 11/355,233

(22) Filed: Feb. 14, 2006

(65) Prior Publication Data

US 2006/0195446 A1  Aug. 31, 2006

Related U.S. Application Data (60) Provisional application No. 60/656,326, filed on Feb. 25, 2005, provisional application No. 60/656,338, filed on Feb. 25, 2005, provisional application No. 60/656,325, filed on Feb. 25, 2005, provisional application No. 60/656,337, filed on Feb. 25, 2005, provisional application No. 60/656,315, filed on Feb. 25, 2005.

(51) Int. Cl.
*G06N 5/00* (2006.01)

(52) U.S. Cl. .......................................... 706/47; 706/45

(58) Field of Classification Search .................. 706/47, 706/45; 707/1; 382/186
See application file for complete search history.

(56) References Cited

U.S. PATENT DOCUMENTS 7,283,670 B2 * 10/2007 Wakeam et al. ............. 382/186
7,289,973 B2 * 10/2007 Kiessig et al. ................. 707/1

* cited by examiner

*Primary Examiner*—Wilbert L Starks, Jr.
(74) *Attorney, Agent, or Firm*—Technology Law Group, PLLC; Robert A. Huntsman (57) ABSTRACT

A system and method for the transformation of event correlation rules, such as those written in the Effective Policy through Intelligent Correlation (EPIC) Rule Language, into programming constructs that implement the functionality described by the rule. A match network module performs matching of rules by applying a forward chaining algorithm to an evaluation graph by matching network events that have been encapsulated into one or more tickets in the match network module. For every successful matching rule upon one or more network events reflected in tickets, the match network module creates at least one suggested responsive action. Since one input may satisfy multiple rules, a list of suggested responsive actions is created and sent to a conflict resolution module.

30 Claims, 5 Drawing Sheets

MATCH NETWORK CONSTRUCTION

CROSS-REFERENCE

This application claims priority to U.S. Provisional Patent Application No. 60/656,326, filed Feb. 25, 2005 and entitled EFFECTIVE POLICY THROUGH INTELLIGENT CORRELATION (EPIC) RULE LANGUAGE; U.S. Provisional Patent Application No. 60/656,338, filed Feb. 25, 2005 and entitled MATCH NETWORK CONSTRUCTION; U.S. Provisional Patent Application No. 60/656,325, filed Feb. 25, 2005 and entitled TEMPORAL RESOLUTION OF JOIN NODES IN EVENT CORRELATION; U.S. Provisional Patent Application No. 60/656,337, filed Feb. 25, 2005 and entitled REAL-TIME THRESHOLD STATE ANALYSIS; U.S. Provisional Patent Application No. 60/656,315, filed Feb. 25, 2005 and entitled TEMPORAL KNOWLEDGE-BASE, the disclosures of which are hereby incorporated by reference in their entireties.

FIELD OF INVENTION

The preferred embodiment of the invention disclosed herein relates to the field computer networking systems. More particularly, the preferred embodiment of the invention relates to the field of computer network security, including the practice of using textually defined correlation rules to specify network activity of interest, matching such rules against actual computer network activity, and to perform rule-specified actions when network activity matches one or more of the specified correlation rules.

BACKGROUND OF THE INVENTION

Rule-based computer network security systems are well known in the art. Traditional rules specification practices are based upon the practice of using constructs based on expression evaluation, with both an implied and expressed order of operation, both within single statements and across multiple statements. While it is generally possible to describe network activity of interest with such systems, it quickly becomes cumbersome when trying to describe a rule set sufficient to detect computer network activity of interest, because such activity frequently involves multiple events that do not always occur in the same chronological order. Thus, rule systems in the prior art having implicit or explicit orders of operation require many permutations of a particular rule to cover variations in occurrence patterns, and such rule sets grow exponentially as the network traffic of interest grows in size. This makes it very difficult to build, troubleshoot, and maintain rule sets sufficiently broad to protect a computer system in a modern networking environment. What is needed is a system to both efficiently specify rules to describe complex network traffic patterns of interest, free of cumbersome order-of-operation restrictions, and to be able to efficiently and accurately match incoming network traffic against a concisely specified rule set, and thus be able to protect computer networks from attacks and to take appropriate protective actions as specified by the rules.

SUMMARY

In one embodiment, a match network module comprises an evaluation graph sub-module configured to control one or more processing threads that match rules to network events and a thread pool sub-module configured to store the one or more processing threads. The match network module further comprises a rule maintenance sub-module configured to build, delete, and/or modify event correlation rules and a match store sub-module configured to maintain the components of an event correlation rule path in the evaluation graph sub-module. The match network module further comprises a configuration handler sub-module configured to receive instructions for adding, deleting, and/or modifying event correlation rules, and an action suggestions sub-module configured to create suggestions for handling event correlation rules based on inputs received from the evaluation graph sub-module.

In another embodiment, a method is implemented for matching an event correlation rule stored in a match network module to network events. The method comprises creating a ticket, referencing an input in a working memory module containing a representation of network events and storing the ticket in a ticket priority queue. The method further comprises selecting the ticket from the ticket priority queue and processing the selected ticket by applying a forward chaining algorithm which matches input data stored in the working memory module to the event correlation rule. For every successful matching rule upon a ticket, the method comprises creating an action suggestion to be sent to a conflict resolution module.

In another embodiment, a method is implemented for transforming an event correlation rule into a programming construct that implements the functionality described by the rule. The method comprises parsing the event correlation rule into sections containing one or more declarations, conditions, or resultant actions, parsing the declarations into evaluation graph inputs, system query inputs, and definitions of time values for correlation nodes, and parsing the conditions into nodes of the evaluation graph based on a needs analysis of the event correlation rule. The method further comprises placing each node of the evaluation graph into a table based on its type and based on its location in the event correlation rule and building a correlation table, introducing new nodes as needed to join the inputs of the evaluation graph. The method further comprises adding the system query inputs to the ends of the proper paths in the evaluation graph, and parsing the resultant actions to create nodes which are added to the end of the evaluation graph.

These and other embodiments of the present application will be discussed more fully in the detailed description. The features, functions, and advantages can be achieved independently in various embodiments of the present application, or may be combined in yet other embodiments.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Match Network Construction provides a mechanism for the transformation of event correlation rules, such as those written in the Effective Policy through Intelligent Correlation (EPIC) Rule Language, into programming constructs that implement the functionality described by the rule. Although there are Artificial Intelligence based constructs, as well as related compilers, that perform similar capabilities for traditional programming languages, none of these supports the unique properties, capabilities and syntax of event correlation rules.

Match Network Construction fully implements the unique properties, capabilities and syntax of event correlation rules. With this methodology, it is now possible to transform the unique elements of event correlation rules into their corresponding programming constructs. These constructs can then be relied upon to execute the precise instructions described in the rule utilizing a memory-based computing model that maximizes both real-time event correlation capacity and performance.

Figure 1:
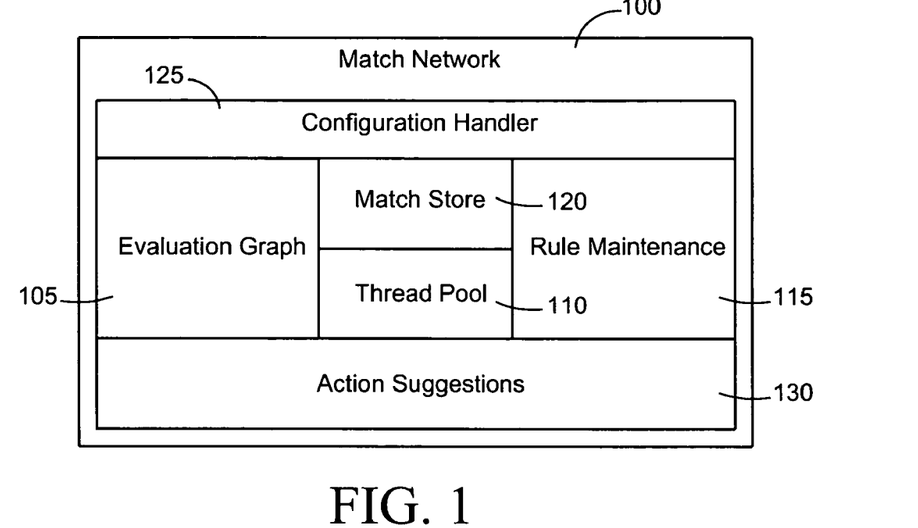
FIG. 1 illustrates an exemplary embodiment of a Match Network module.

FIG. 1 illustrates one exemplary embodiment of a match network module 100. In the illustrated embodiment, the match network module 100 comprises the following sub-modules: (a) the evaluation graph sub-module 105, (b) the thread pool sub-module 110, (c) the rule maintenance sub-module 115, (d) the match, or rule node, store sub-module 120, (e) the configuration handler sub-module 125, and (f) the action suggestion sub-module 130.

The terms "module" and "sub-module" as used herein, may refer to any combination of software, firmware, or hardware used to perform the specified function or functions. It is contemplated that the functions performed by the modules described herein may be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless telecommunications network, or the Internet.

In operation, the match network module 100 performs matching of rules to patterns. It does this by applying a forward chaining algorithm matching input data stored in the working memory to rules in the match network module 100. When a ticket, referencing an input in the working memory module, is created, the ticket is placed in a ticket priority list. The ticket priority list is a means of transferring and queuing input to the match network module 100. The priority queue may enforce queuing based upon a priority value given to all tickets to scale their importance in which needs to be processed first. In some embodiments, the priority queue employs a starvation algorithm to ensure that all tickets eventually get processed by the match network 100.

The match network 100 de-queues a ticket from a priority queue, populated by the working memory, and processes the ticket by applying the rule matching algorithm. For every successful matching rule upon a ticket, the match network 100 creates an action "suggestion." Since one input may satisfy multiple rules, a list of suggestions may be created. This list of "suggestions" of actions to perform is sent to a conflict resolution module (not shown). The conflict resolution module selects which of the suggested actions should be carried out and which should be ignored due to reasons including but not limited to action duplication.

Figure 2:
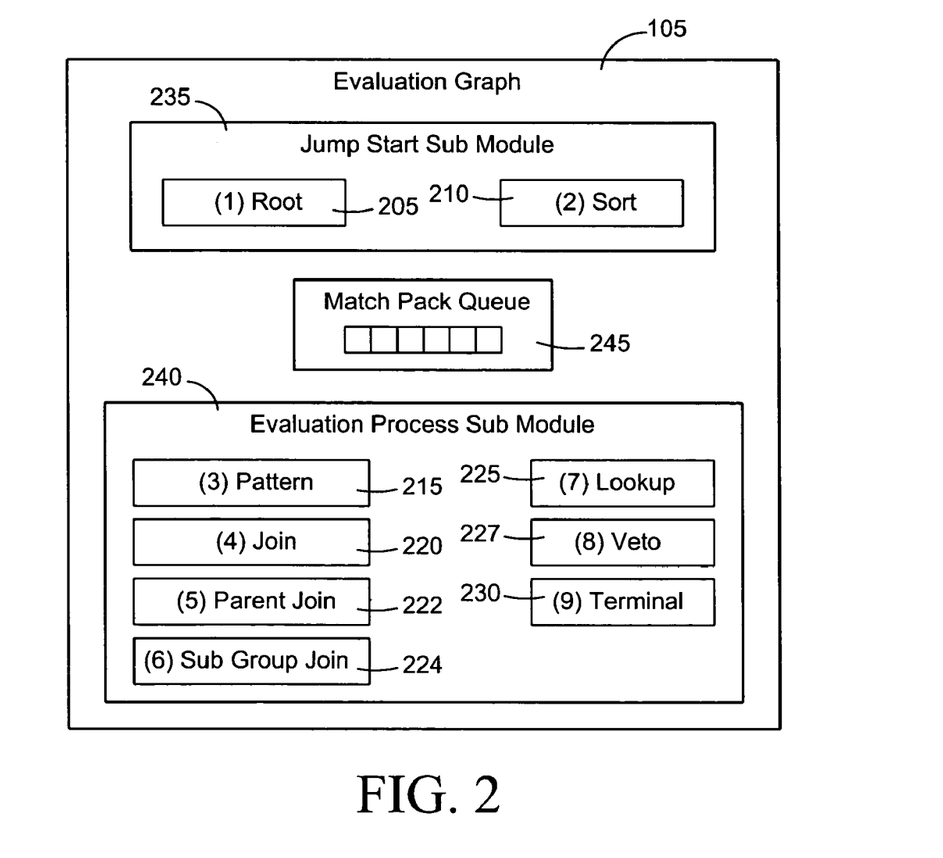
FIG. 2 illustrates an exemplary embodiment of the Evaluation Graph sub-module.

FIG. 2 illustrates one exemplary embodiment of the Evaluation Graph sub-module 105. In some embodiments, the Evaluation Graph (EG) sub-module 105 controls the processing threads that match rules to patterns. The matching process is performed by determining a rule path through comparison nodes starting from a root and ending at a leaf terminal node, as shown in the exemplary Evaluation Graph 300 of FIG. 3. In the illustrated embodiment, match processing is divided into nine conceptual match phases: (a) the root match 205, (b) the sort match 210, (c) the pattern match 215, (d) the join match 220, (e) the parent join match 222, (f) the sub group join match 224, (g) the lookup match 225, (h) the veto match 227 and (i) the terminal match 230. In some embodiments, the phases are represented in two sub-modules: (a) the jump start sub module 235 for the root phase 205 and the sort phase 210, and (b) the compare sub module 240 for the pattern phase 215, join phase 220, parent join phase 222, sub group join phase 224, lookup phase 225, veto phase 227 and terminal phase 230. In addition to the two sub-modules, the rule processing maintains a node queue 245. This queue 245 holds match packs that will next be used or processed.

If the Match Pack Queue 245 is empty, the Evaluation Graph sub-module 105 gets a new ticket from the Ticket Priority Queue (a separate Contego Policy Component described above), and starts processing it by calling the Jump Start sub module 235. If the Match Pack Queue 245 is not empty, the Evaluation Graph sub-module 105 grabs a match pack and calls the Evaluation Process sub module 240.

In operation, the Jump Start sub-module 235 acts as the root node by being the single point of entry. The sort node is called and it investigates an attribute value that is common for all tuples, the ATTRIBUTE_TYPE attribute. This tuple attribute value is a constant value that identifies what type of system data the tuple represents, e.g., alert, group, threshold, etc. Based on the value of the tuple type, the sort module 210 retrieves a sorting data structure from the match store 120 and performs a specific sort operation given for this tuple type. In some embodiments, each tuple type has its own sub module that handles the sort operation specific for that type. The sort operation in essence uses an algorithm to retrieve an element from the match store 120 to acquire an address to the next step in the Evaluation Graph sub-module 105. In some embodiments, the policy component will handle three different types of tuple types: alerts, thresholds and state variables, which means it has three sort sub modules and three match store data structures. This sub module also creates a Match Pack for each Address Box it found matching the input. The match packs are placed in the match pack queue 245.

In operation, the Evaluation Process sub module 240 handles the pattern matching nodes P1-P4, join nodes J1-J2, parent join nodes PJ1, sub group join nodes SGJ1, lookup nodes L1, veto nodes V1 and terminal nodes T1 in the Evaluation Graph 300. The Evaluation Process 240 receives a Match Pack and pulls the Address Box and ticket set from it. The ticket set is given to the Address Box and from there to the process node. If the process node returns a ticket set, the Address Box returns the ticket set as well and the Evaluation Process calls for the list of new Address Boxes from the Address Box. If the process node returns a false, the ticket reference count is decremented and the processing thread is added back to the thread pool. As the ticket sets and their corresponding tuples move through the evaluation process 240, they pass through the various phases shown in FIG. 3. If particular phases do not contain nodes, then those phases may be skipped.

Figure 3:
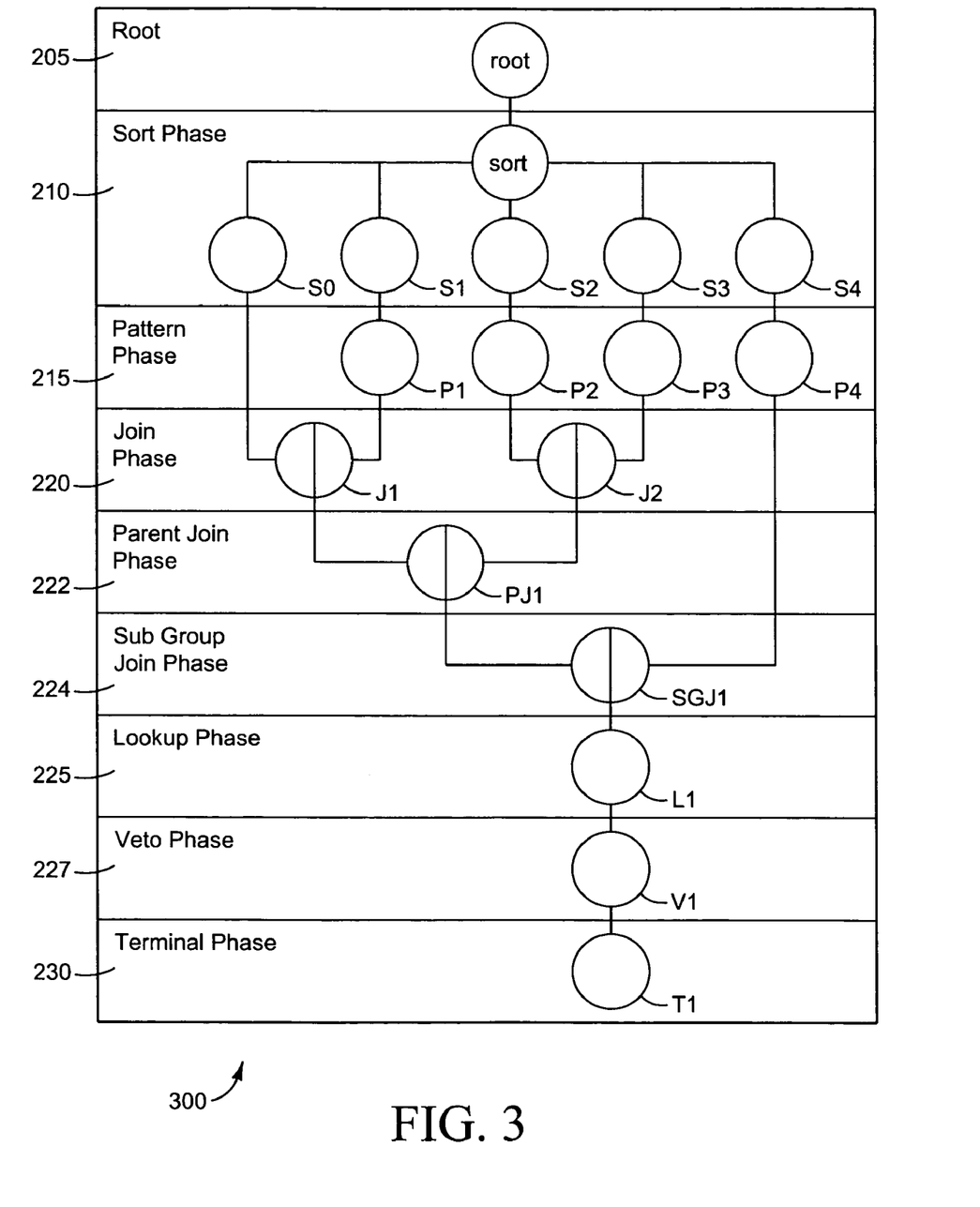
FIG. 3 illustrates an exemplary embodiment of a tree-oriented Evaluation Graph.

The pattern phase 215 attempts to match a pattern in a rule on a fact in the knowledge base, i.e., perform a set of conditions on a data tuple. Each condition in the graph 300 comprises a pattern for a particular tuple type. The condition describes the attributes/values that a tuple must contain and acts as a filter. Each condition in a rule gets transformed into a comparison node and edged to each other forming a "network downstream" path, where only tuples matching the specified attributes may pass. Tuples matching a comparison node are passed along to the next comparison node in succession or to the join phase 220 or terminal phase 230.

Once it has been determined which patterns have been matched by a tuple in the pattern phase 215, the join phase 220 performs comparisons of bindings across input tuples. Tuples are compared to verify that attributes in one tuple match those in a different tuple. The cross tuple comparison is performed by join nodes forming a join network, as shown in FIG. 3.

Figure 4:
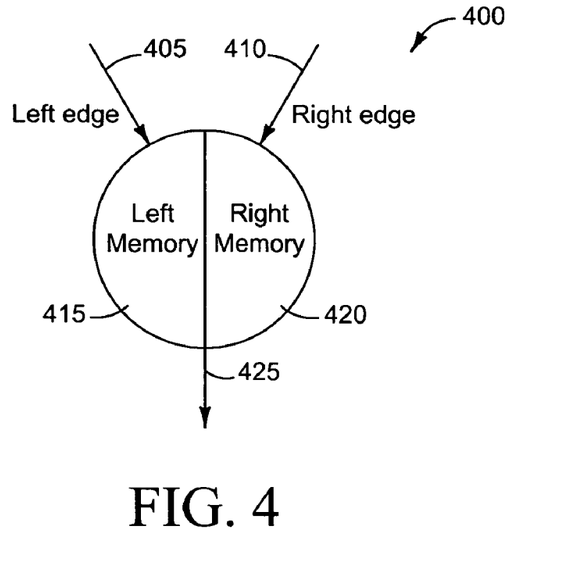
FIG. 4 illustrates an exemplary embodiment of a join node.

FIG. 4 illustrates one exemplary embodiment of a join node 400. In the illustrated embodiment, the join node 400 comprises two input edges, a left input edge 405 and a right input edge 410, that lead to a left memory 415 and a right memory 420 respectively. Tuples arriving on the left edge 405 are stored in the left memory 415 and compared with tuples in the right memory 420 arriving on the right edge 410. Tuples matching attribute values move on to the output edge 425 and to the next node or set of nodes in its path, eventually terminating at a terminal node in the terminal phase 230.

Comparison nodes may be grouped to form more precise comparisons. Groups of comparisons may be contained within other groups forming a parent contains child structure. Special join nodes in the parent join phase 222 can be used to compare tuples in a parent group to tuples in a child group. Likewise, a parent group can compare tuples from its child groups with its own tuples in a sub group join phase 224.

The lookup phase 225 comprises one or more lookup nodes. A lookup node can query the policy component for information. Lookup nodes can compare the information they receive from the policy component with information in the tuples.

The veto phase 227 comprises one or more veto nodes. A veto node determines if data in the tuples should be allowed to continue to the terminal phase. Veto nodes are used when data is requested to "not exist". Veto nodes scan the tuples received and any data that it specifically looks for that should not exist is not allowed to progress to its next phase.

The terminal phase 230 comprises one or more terminal nodes. A terminal node is a node that indicates a successful match for a rule. The above-described approach of using basic structured nodes to perform decision making is advantageously simple, maintainable and scalable. For example, if requirements to the functionality of the match graph are extended, new nodes can be added to the graph 300.

Figure 5:
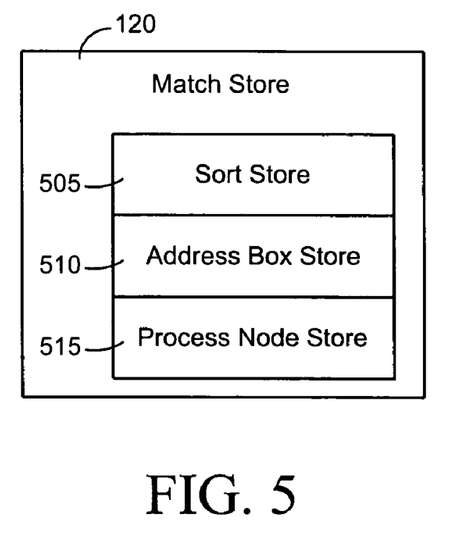
FIG. 5 illustrates an exemplary embodiment of the Match Store sub-module.

FIG. 5 illustrates one exemplary embodiment of the Match Store sub-module 120. In some embodiments, the Match Store sub-module 120 is responsible for maintaining the building blocks of a rule path in the Evaluation Graph sub-module 105. The store 120 is divided into sub modules, each of which is responsible for maintaining the different types of building blocks that make up a path. In the illustrated embodiment, the initial sub modules of the match store 120 include: (a) the Sort store 505 that handles the building blocks of the sort match; (b) an address box store 510 for each phase that handles Address Boxes that are used for path routing in the pattern, join, lookup and terminal match phases; and (c) a process node store 515 for each phase that contains the nodes that perform operations that decides if a path is valid or not.

In some embodiments, the Match Store 120 itself comprises a class containing hash tables for the sort store 505, the Address box Stores 510, and the Process Node Stores 515. It is possible that no other classes may be able to access the Sort Store 505, Address Box Stores 510, or Process Node Stores 515 directly.

Figure 6:
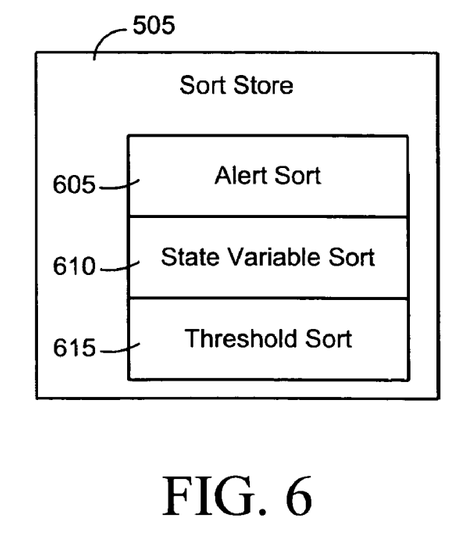
FIG. 6 illustrates an exemplary embodiment of the Sort Store sub-module.

FIG. 6 illustrates one exemplary embodiment of the Sort Store module 505. In the illustrated embodiment, the Sort Store 505 of the match store 120 contains a sub module for every type of tuple that is to be handled by the sort phase 210. The initial set of sort modules include Alert Sort 605, State Variable Sort 610 and Threshold Sort 615. The Alert Sort 605, State Variable Sort 610, and Threshold Sort 615 shown in FIG. 6 are not needed in some embodiments of the policy component, but it can be added for completeness and extensibility.

In operation, the alert sort sub-module 605 is responsible for match sorting tickets that represent alert type tuples (ALERT_TYPE). When the ticket is passed to the alert sort 605, the alert sort 605 retrieves the value from the attribute named ALERT_ID on the tuple. This value contains the "alert address" within the alert hierarchy scheme that has the form of a sequence of numbers separated by punctuations. Example: a generic alert type has an alert ID of 1 while a Security alert has the alert ID value of 1.1, etc. This value is tokenized on the punctuations, and for each valid sub alert ID contained in the ALERT_ID attribute, the alert sorter 605 makes a lookup in a hash table keyed on the alert ID value. The elements of the table comprise a vector that contains Address Box references to other nodes in the Evaluation Graph 300.

The threshold sort sub-module 615 is responsible for match sorting tickets that represent threshold type tuples (THRESHOLD_TYPE). When the ticket is passed to the threshold sort 615, the threshold sort 615 retrieves the value from the attribute named THRESHOLD_ID on the tuple. This value contains a unique name that identifies a threshold value in the working memory. The threshold sort 615 then uses this unique name to make a lookup in a table that is keyed off the threshold name. The elements of the table comprise a vector that contains Address Box references to other nodes in the Evaluation Graph 300.

The State variable sort sub-module 610 is responsible for match sorting tickets that represent state variable type tuples (STATEVARIABLE_TYPE). When the ticket is passed to the state variable sort 610, the state variable sort 610 retrieves the value from the attribute named STATEVAR_ID on the tuple. This value contains a unique name that identifies a state variable value in the working memory. The state variable sort 610 then uses this unique name to make a lookup in a table that is keyed off the state variable name. The elements of the table comprise a vector that contains Address Box references to other nodes in the Evaluation Graph 300. Statevars may be broken into two pieces to accommodate some language issues. For example, one piece may hold a single piece of data, and another piece may hold a list of data.

Figure 7:
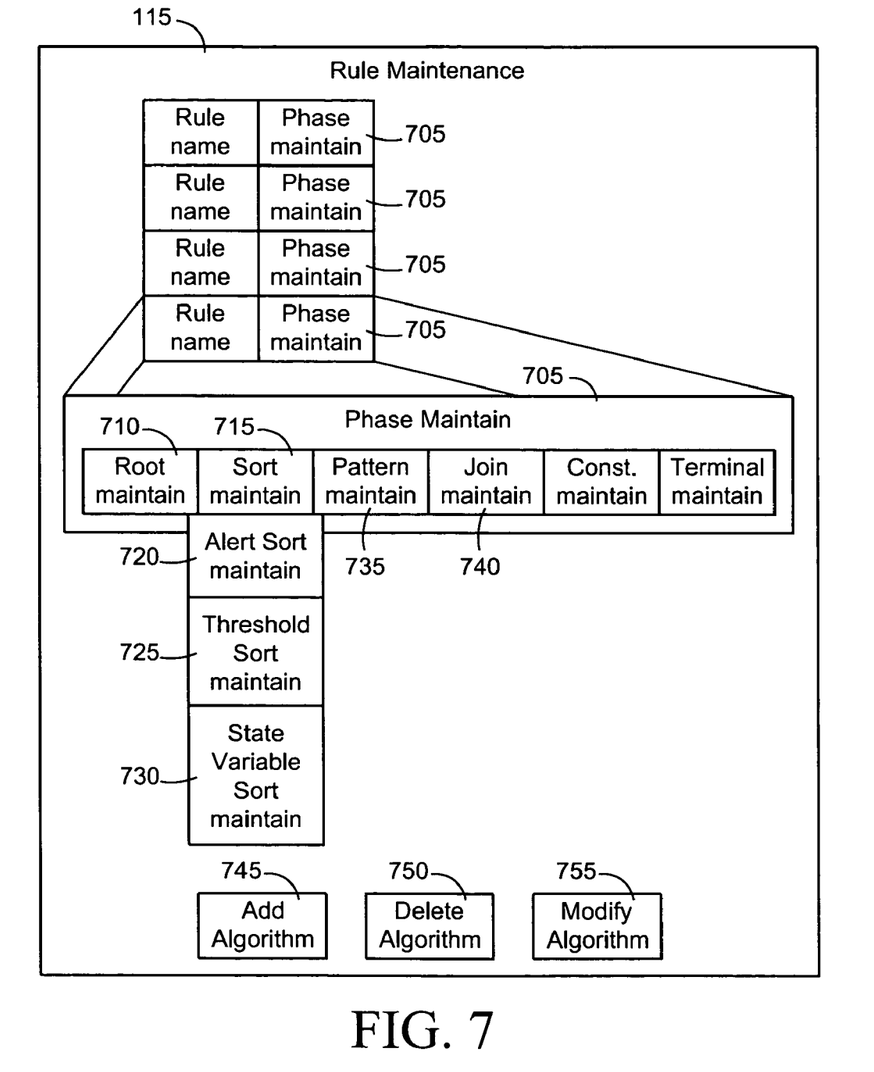
FIG. 7 illustrates an exemplary embodiment of the rule maintenance sub-module.

FIG. 7 illustrates one exemplary embodiment of the rule maintenance sub-module 115. In some embodiments, the rule maintenance sub-module 115 is in charge of bookkeeping the elements in the node store that are associated with each particular rule. It also is responsible for building a rule (adding nodes to the match store 120) and deleting a rule (remove nodes from the node store). The rule maintenance sub-module 115 therefore comprises algorithms for adding and removing rules and a rule lookup table, as shown in FIG. 7.

The lookup table comprises a hash table that hashes on the rule names as keys. The element comprises a vector list of evaluation graph conceptual-phase-maintain sub modules 705. In some embodiments, there are separate modules for each match phase, and they are responsible for bookkeeping a rules presence in each of the rule match phases.

The root maintain sub-module 710 shown in FIG. 7 is not needed in some embodiments of the policy component, but it can be added for completeness and extensibility.

The sort maintain sub-module 715 is responsible for bookkeeping a rules presence in the sort store 505. The sort maintain sub-module 715 can be divided into sub modules each handling the separate sub module cases of the sort match. In the illustrated embodiment, the sub modules include: (a) the Alert sort maintain sub-module 720, (b) Threshold sort maintain sub-module 725, and (c) State variable sort maintain sub-module 730.

In operation, the alert sort maintain 720 keeps track of a rules presence in the alert sort match phase. It can do this by maintaining a data structure that references the alert sort entries in the match store 120 that are associated with the given rule. The threshold sort maintain 725 keeps track of a rules presence in the threshold sort match phase. It can do this by maintaining a data structure that references the threshold sort entries in the match store that are associated with the given rule. The state variable sort maintain 730 keeps track of a rules presence in the state variable sort match phase. It can do this by maintaining a data structure that references the state variable sort entries in the match store that are associated with the given rule.

The pattern maintain sub-module 735 is responsible for tracking the Address Boxes used in the Pattern Phase by each particular rule. In some embodiments, the Address Boxes themselves track the nodes they are linked to. The tracking can be done through references to either the Address Box or nodes as needed. Similarly, the join maintain sub-module 740 is responsible for tracking the Address Boxes used in the Join Phase by each particular rule. The tracking can be done through references to either the Address Box or nodes as needed.

In the illustrated embodiment, the Rule Maintenance sub module 115 also contains algorithms for adding, deleting, and modifying rules, as described below. The Add Algorithm 745 may utilize its own set of classes to parse the rule structure and create and connect the nodes. In some embodiments, the Add Algorithm 745 accepts a rule as a raw string and parses it, creating nodes as it goes and dropping them into vectors representing the different phases of the match network 100. Each phase is taken in turn and all possible connections are made. The outputs from one phase are used as inputs to the next phase and connections are made there as well, if possible.

In some embodiments, the Delete Algorithm 750 receives a rule to delete, pulls it from the hash table, and systematically has each maintain delete its pieces. Each piece, in turn, tells its pieces to decrement their reference counts by one. Upon reaching zero, they too delete themselves, tell their pieces to decrement ref counts, and so forth until everything is deleted. Each node, address box, etc. knows how to delete itself and anything it uses.

In some embodiments, the Modify Algorithm 755 uses the Delete Algorithm 750 to delete an old rule, and then replaces it using the Add Algorithm 745. When a rule is changed, its node memories can be wiped, because there may be no way to tell what a modification to the rule might mean to the tickets it is already processing.

In some embodiments, the rule maintenance sub-module 115 may also occasionally flush the rules to verify that orphaned nodes/address boxes do not exist in the network 100.

Referring again to FIGS. 1 and 2, the thread pool sub-module 110 is the location for the processing threads that will be used. In operation, active Match Packs are picked up from the match pack queue 245 by a thread and processed as needed in the Evaluation Process sub module 240. When the match pack queue 245 is empty, new tickets can be picked up from the Ticket Priority Queue (not shown) and inserted into the Evaluation Graph sub-module 105 by means of the Jump Start sub module 235. Threads will also track which tickets are still active by notifying the Action Suggestion sub module 130 if it is putting a ticket in the queue or not.

A single input tuple to the Evaluation Graph sub-module 105 may satisfy several rule paths and hence reach more than one terminal node. When a terminal node is reached, a "suggestion" representing a request for action is created in the action suggestion sub module 130. When the input tuple has followed every possible path and all terminal nodes have been identified, the action suggestion sub module 130 may contain none to many suggestions. This set of suggestions is then forwarded to a conflict resolution module (not shown).

The action suggestion sub-module 130 can be viewed as a glorified hash table that holds suggestions generated by a particular ticket in a vector. As long as a ticket is still actively moving through the match network 100, the suggestions it has so far created will wait for it to complete. Tickets that get stuck in join node memory are no longer considered active.

In operation, the configuration handler sub-module 125 registers itself to the Translator in the main Policy Component (not shown). The Translator receives policy configurations from a User Interface or from files stored on disk. It then decides what the Configuration Handler 125 will need from the policy configuration and sends it. The Configuration Handler 125 receives instructions for adding and deleting rules, global variables. A Configuration Parser parses the xml received from the Translator and determines if rules should be added, modified, or deleted. As it parses the xml, it calls upon the rule maintenance sub-module 115 to carry out instructions.

In some embodiments, dumping of the match network 100 to disk can be performed by the match store sub module 120, rule maintenance sub module 115, and the ticket queue. All data needed for the entire match network 100 can be located. In addition, paging involves moving nodes and address boxes that are rarely used to disk instead of holding them in memory. In this way, memory can be freed up for more important matters.

The match network module 100 comprises a set of data structures and algorithms that provide matching of rules to patterns and maintaining of the rule structures (add, delete and modify). Examples of data structures utilized in various embodiments of the match network module 100 are described below.

A "ticket set" comprises a wrapper for a set of tickets (built by the tuple store). Ticket sets can be pulled out of Graph Packets and passed to Address Boxes and Process Nodes for comparisons. Ticket Sets are created by the Evaluation Graph sub-module 105 in the jump start sub module 235 and are used by various components of the Evaluation Graph sub-module 105, such as, jump start sub module 235, evaluation process sub module 240, address boxes, process nodes and graph packets.

"Graph Packets" (GP) hold routing information and the ticket set that is being routed. The routing information comprises the controlling ticket id (the ticket that is 'currently' being processed), the priority of the packet, and an Address Box for it to visit next. Graph packets are created by the Evaluation Graph sub-module 105 in the jump start sub module 235, and are used by various elements of the Evaluation Graph sub-module 105 including the jump start sub module 235 and the evaluation process sub module 240.

A "query handle" is much like a ticket, only it is held statically on a process node in the Evaluation Graph 300. The query handle performs a query lookup on state variables in the working memory or queries on the system query module. The query handle contains a reference to the System Query module or to the working memory state variable store. When acted upon, the query handle performs a query method call upon its reference with a 'query string' created by the process node. Query handles are created by the add algorithm 745 of the rule maintenance sub-module 115, and are used by process nodes.

"Address boxes" (AB) are stored in the Match Store 120. An address box comprises an object that can be used as a building block for defining a path in the Evaluation Graph 300. The Address Box comprises a reference to a process node and the next Address Boxes a Graph Packet should visit. The process node and other Address Boxes are in the Match Store's node store and Address Box store respectively. Address boxes are created by the add algorithm 745 of the rule maintenance sub-module 115, and are used by the Evaluation Graph sub-module 105 in the jump start sub module 235 and evaluation process sub module 240.

"Process nodes" are created by the add algorithm 745 of the rule maintenance sub-module 115, and are used by address boxes. Several specific examples of process nodes are described below.

"Pattern nodes" are the simplest of the process nodes. A pattern node receives one input but can have multiple outputs. The pattern nodes attempt to match a tuple attribute value with a constant or variable value. A variable value is a value that may be changed without triggering a reevaluation of a rule (i.e., a lookup state variable or a group list outside the policy component).

"Join nodes" have two inputs and usually contain one output, but can have multiple outputs in some cases. An exemplary join node 400 is illustrated in FIG. 4. Join nodes contain a left and right memory depending on whether the ticket set came from the left or right input. Three exemplary types of join nodes are described below. "Presence Joins" simply wait for presence of ticket sets on both sides of its memory and join them in a single ticket set to be sent to the next node. "Field Joins" perform the tasks of the Presence Joins, and also match two fields on two separate input tickets. "Ticket Joins" perform the tasks of the Presence Joins and possibly those of the Field Joins, and also match two ticket types to verify that they are the exact same ticket, or that they are not the exact same ticket. Example: one ticket can be routed to multiple places at once and these nodes make sure that as the join phase comes to a close, the same tickets are not considered two separate tickets. Every ticket includes a unique id and the node will store information about which specific alerts will need to be either the same, or different.

"Lookup nodes" lookup some constant value in a group or statevar. A lookup node can use the Query Handler to perform this lookup. It does not add anything to the ticket set, but it allows the ticket set to continue to the next node.

"Terminal Nodes" are the last stop for the ticket set. Here, an action suggestion will be created based on the action plans located on the terminal node itself, and the data contained in the ticket set.

"Action Plans" comprise udl structures in which certain fields are filled in by the terminal node based on the data in the ticket sets. This plan will be sent on as an action suggestion.

Each node containing memory comprises a certain "response window" in which it will allow data to be merged together. This window requires that the data be held for some length of time, and that any data held can be merged if it succeeds all other merge requirements on the node.

In some embodiments, a sub section of a node, called a comparer, will receive any two pieces of data, determine their types, and then compare them appropriately. This comparison may result in pulling class names from the Integer and String (etc) objects to verify they can be compared correctly.

In other embodiments, each data type is wrapped with a Contego Policy Data Type object. This allows for full control over the data including but not limited to: determining what data is maintained, determining how that data compares to other data of either similar or differing types, and determining how that data can be translated into strings, boolean values, integers, or other data. In these embodiments, each data type contains null values for all but the data it is currently storing. One benefit to this approach is that wrapping the String class would be beneficial in other ways as well (e.g., can change its value and still maintain the same hash code). The Contego Policy Data Type would have the compare method on it and accept another Contego Policy Data Type as an argument. It is possible that the Contego Policy Data Type could be utilized by an entire Contego system.

Data types can be created by a separate policy component, and can be used by the process nodes in the Match Network 100.

EXAMPLE

In some embodiments, the Match Network Construction process begins with an event correlation rule written in an event construction language, such as the EPIC Rule Language, and ends with a series of Data Structures and Nodes in a tree-oriented Evaluation Graph 300, as illustrated in FIG. 3. The Evaluation Graph 300 comprises an efficient mechanism for the analysis of highly interdependent data, and so is well-suited to modeling complex event correlations. Nodes in the graph 300 consist of one or two routing structures to route data moving through the graph, and a work structure where comparisons, system queries and other actions are carried out.

In one exemplary embodiment, the following steps are performed:

1. The Rule is passed to a Rule Parser where it is segmented into sections containing the basic declarations, conditions, and resultant actions.

2. Declarations are parsed into Evaluation Graph 300 inputs, System query inputs, and definitions of time values for correlation nodes.

3. Conditions are parsed into required nodes based on a needs analysis of the rule and into groups describing if certain sets of nodes/groups should be ANDed or ORed.

4. Each node is placed into a table based on its type (existence, pattern, correlation, and query) and based on its location in the rule (its particular grouping). Inner groups are also placed into table locations before obtaining their own sets of tables.

5. Starting with the outermost group and working in, each table in the group is done in order: existence, pattern, and correlation. As nodes are completed they are moved to a different set of tables, and later all completed nodes are moved to the parent group's set of completed tables.

6. During the phase in which the correlation table is built, new nodes are introduced as needed to join all inputs, and to join inputs from a parent and/or child group.

7. System query inputs are held to the side until all other nodes in all other groups are completed, and then they are added to the ends of the proper paths in the Evaluation Graph 300.

8. Lastly, the resultant actions section is parsed and nodes are created and added to the end of the Evaluation Graph 300.

Figure 8:
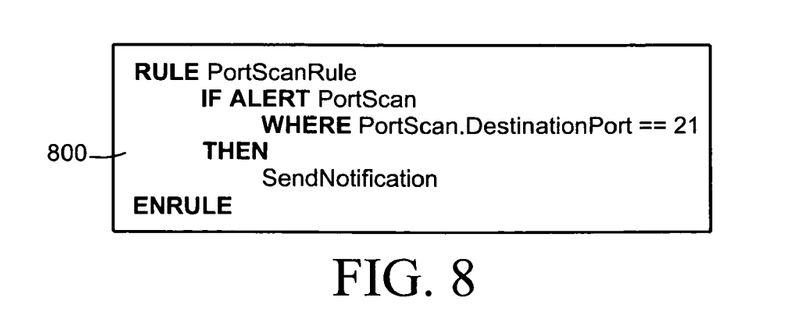
FIG. 8 illustrates an exemplary "PortScanRule" construct.
Figure 9:
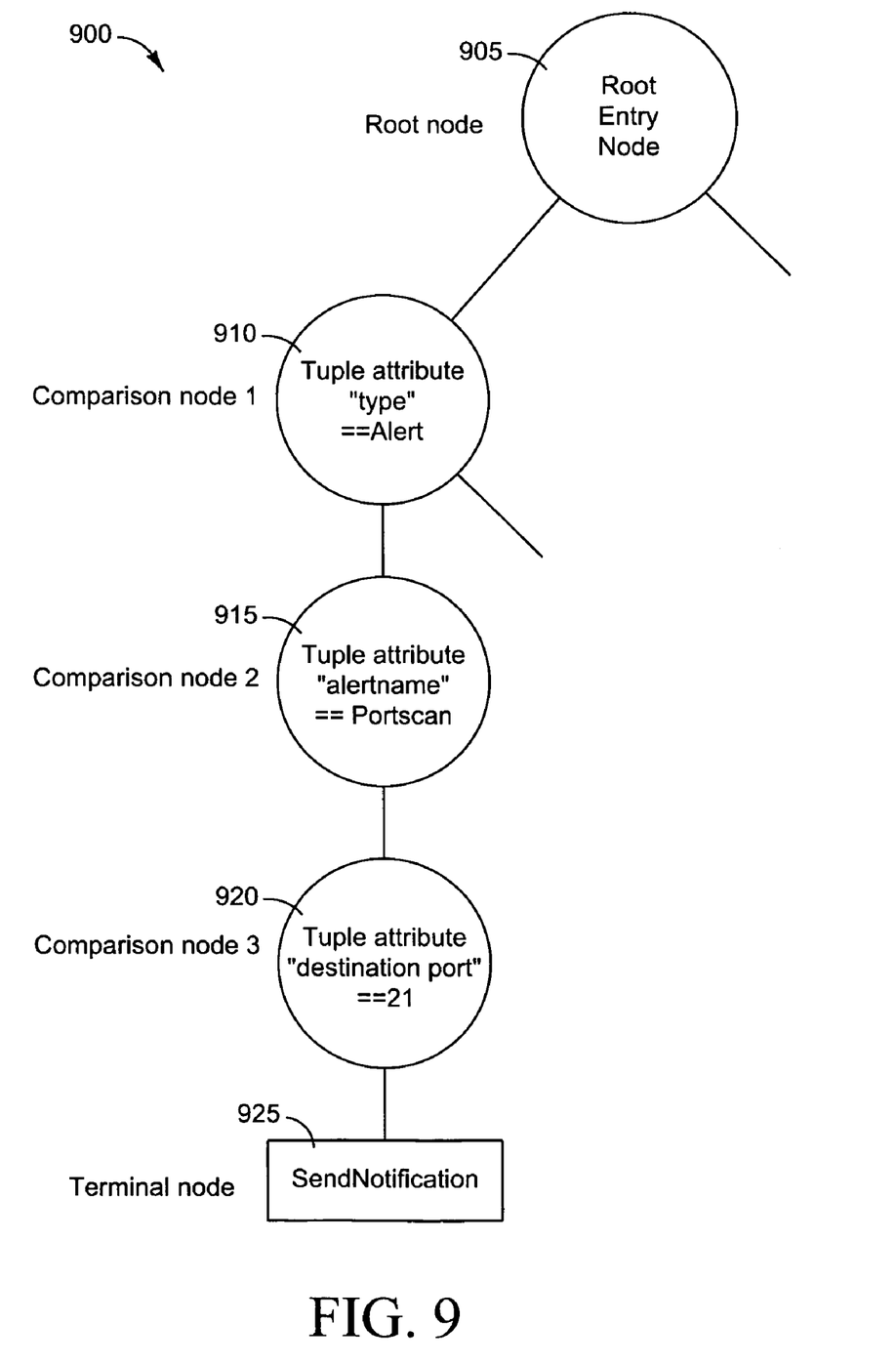
FIG. 9 illustrates a exemplary Evaluation Graph based on the "PortScanRule" construct shown in FIG. 8.

A specific example illustrating the operation of the Match Network 100 is described below. This example involves the "PortScanRule" construct 800 illustrated in FIG. 8. In operation, the translator module (not shown) parses the rule 800 and configures the match network 100 based on the information in both the condition and action part of the rule 800. Based on the rule 800, the match network module 100 constructs an Evaluation Graph 900, as illustrated in FIG. 9.

When a portscan alert is received by the policy component, a tuple is created for that alert and an associated ticket is handed to a worker thread. An example of a tuple in this case would be: Pattern Tuple=[{type, Alert}, {alert name, Portscan}, {destination port, 21}]

The worker thread starts at the root searching for a path "downstream" the Evaluation Graph 900. The ticket starts off at the root node 905 and is passed along the edge to a first comparison node 910. If the expression of the first comparison node 910 matches the pattern tuple, the ticket is passed along the edge to a second comparison node 915, and so on. In the example described above, the tuple's attribute values match the path in the example Evaluation Graph 900, and the ticket will reach the terminal node 925, signaling a matched rule. The terminal node 925 creates an action suggestion of sending a notification using the ticket and passes it on to the action suggestion sub module 130, where it is held until the ticket has walked all possible paths in the Evaluation Graph 900. When the ticket processing of the Evaluation Graph 900 has identified all possible paths leading to terminal nodes 925, the list of suggestions is passed on to the conflict resolution module (not shown).

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A match network module comprising:
   an evaluation graph sub-module configured to control one or more processing threads that match event correlation rules to network events that have been encapsulated into one or more tickets;
   a thread pool sub-module configured to store the one or more processing threads;
   a rule maintenance sub-module configured to build, delete, and modify event correlation rules;
   a match store sub-module configured to maintain the components of an event correlation rule path in the evaluation graph sub-module;
   a configuration handler sub-module configured to receive instructions for adding, deleting, and modifying event correlation rules; and
   an action suggestions sub-module, said action suggestions sub-module is interfaced to said evaluation graph sub-module wherein said action suggestion sub-module creates suggestions for responding to said network events.

2. The match network module of claim 1, wherein the evaluation graph sub-module comprises a jump start sub-module, an evaluation process sub-module, and a match pack queue.

3. The match network module of claim 2, wherein the jump start sub-module is configured to perform a root match and a sort match.

4. The match network module of claim 2, wherein the evaluation process sub-module is configured to perform a pattern match, a join match, a parent join match, a sub-group join match, a lookup match, a veto match, and a terminal match.

5. The match network module of claim 1, wherein the match store sub-module comprises a sort store sub-module, an address box store sub-module, and a process node store sub-module.

6. The match network module of claim 5, wherein the sort store sub-module comprises an alert sort sub-module, a state variable sort sub-module, and a threshold sort sub-module.

7. The match network module of claim 1, wherein the rule maintenance sub-module comprises a vector list of evaluation graph conceptual-phase-maintain sub modules.

8. The match network module of claim 1, wherein the rule maintenance sub-module is configured to perform an add algorithm, a delete algorithm, and a modify algorithm.

9. A method of matching of an event correlation rule stored in a match network module to a network event, the method comprising:
   creating a ticket, referencing a representation of the network event in a working memory module;
   storing the ticket in a ticket priority queue;
   selecting the ticket from the ticket priority queue;
   processing the selected ticket by applying a forward chaining algorithm which matches the representation of the network event stored in the working memory module to the event correlation rule; and
   for every successful matching rule upon a ticket, creating an action suggestion to be sent to a conflict resolution module.

10. The method of claim 9, wherein the match network module comprises:
    an evaluation graph sub-module configured to control one or more processing threads that match rules to patterns;
    a thread pool sub-module configured to store the one or more processing threads;
    a rule maintenance sub-module configured to build, delete, and/or modify event correlation rules;
    a match store sub-module configured to maintain the components of an event correlation rule path in the evaluation graph sub-module;
    a configuration handler sub-module configured to receive instructions for adding, deleting, and/or modifying event correlation rules; and
    an action suggestions sub-module configured to create suggestions for handling event correlation rules based on inputs received from the evaluation graph sub-module.

11. The method of claim 10, wherein the evaluation graph sub-module comprises a jump start sub-module, an evaluation process sub-module, and a match pack queue.

12. The method of claim 11, wherein the jump start sub-module is configured to perform a root match and a sort match.

13. The method of claim 11, wherein the evaluation process sub-module is configured to perform a pattern match, a join match, a parent join match, a sub-group join match, a lookup match, a veto match, and a terminal match.

14. The method of claim 10, wherein the match store sub-module comprises a sort store sub-module, an address box store sub-module, and a process node store sub-module.

15. The match network module of claim 14, wherein the sort store sub-module comprises an alert sort sub-module, a state variable sort sub-module, and a threshold sort sub-module.

16. The method of claim 10, wherein the rule maintenance sub-module comprises a vector list of evaluation graph conceptual-phase-maintain sub modules.

17. The method of claim 10, wherein the rule maintenance sub-module is configured to perform an add algorithm, a delete algorithm, and a modify algorithm.

18. A method for transforming an event correlation rule into a programming construct that implements the functionality described by the rule, the method comprising:
    parsing the event correlation rule into sections containing one or more declarations, conditions, or resultant actions;
    parsing the declarations into evaluation graph inputs, system query inputs, and definitions of time values for correlation nodes;
    parsing the conditions into nodes of the evaluation graph based on a needs analysis of the event correlation rule;
    placing each node of the evaluation graph into a table based on its type and based on its location in the event correlation rule;
    building a correlation table, introducing new nodes as needed to join the inputs of the evaluation graph;
    adding the system query inputs to the ends of the proper paths in the evaluation graph; and
    parsing the resultant actions to create nodes which are added to the end of the evaluation graph,
    wherein the evaluation graph thus produced is used to match incoming network events against said event correlation rules to identify appropriate responsive actions to the incoming network events.

19. A system for identifying a list of responsive actions in response to a specified list of network events in a computer network environment comprising:
    a set of correlation rules, wherein said network events are matched against each correlation rule,
    a thread pool for launching process threads, wherein each thread independently executes a specified subset of the network event matching,
    a configuration handler, for maintaining correlation rules in a persistent medium,
    a suggestions submodule wherein the suggestion submodule, in response to said network event matching, provides at least one action suggestion deemed to be an appropriate response to the matched network events.

20. The system of claim 19, wherein said suggestions submodule further includes a hash table having hash keys, each hash key has an associated hash value wherein each hash key refers to one or more network events and each hash value refers to a list of actions suggestions.

21. The system of claim 20, wherein said suggestions submodule further includes a conflicts resolution module for managing conflicting and repetitive action suggestions.

22. The system of claim 19, wherein said suggestions submodule further includes a conflicts resolution module for managing conflicting and repetitive action suggestions.

23. A method for identifying a list of responsive actions in response to a specified list of network events in a computer network environment comprising the steps of:
    associating a set of correlation rules with the network environment, wherein said network events are matched against each correlation rule,
    associating a thread pool with the network environment for launching process threads, wherein each thread independently executes a specified subset of the network event matching,
    associating a configuration handler with the network environment, for maintaining correlation rules in a persistent medium,
    associating a suggestions submodule with the network environment wherein the suggestion submodule, in response to said network event matching, provides at least one action suggestion deemed to be an appropriate response to the matched network events.

24. The method of claim 23, wherein said suggestions submodule farther includes a hash table having hash keys, each hash key has an associated hash value wherein each hash key refers to one or more network events and each hash value refers to a list of actions suggestions.

25. The method of claim 24, wherein said suggestions submodule farther includes a conflicts resolution module for managing conflicting and repetitive action suggestions.

26. The method of claim 23, wherein said suggestions submodule farther includes a conflicts resolution module for managing conflicting and repetitive action suggestions.

27. A system for determining a list of security actions corresponding to a specified list of network events in a computer network environment comprising:
    a set of correlation rules, each correlation rule farther includes a correlation test, each correlation rule farther includes an associated list of suggested actions,
    for each network event, a ticket, each ticket further includes a representation of said network event, each ticket further includes a data store for storing a list of suggested response actions,
    wherein, for each ticket, when each correlation test of each correlation rule is applied to each representation of each network event, if the correlation test evaluates to TRUE, the associated list of suggested actions is added to the list of suggested response actions in the data store associated with the ticket,
    wherein the associated list of suggested response actions for all tickets are combined to form a unified list of suggested response actions.

28. The system of claim 27, wherein at least two correlation tests are applied concurrently.

29. A method for determining a list of security actions corresponding to a specified list of network events in a computer network environment comprising the steps of:
    associating a set of correlation rules with the network environment, each correlation rule further includes a correlation test, each correlation rule further includes an associated list of suggested actions,
    associating for each network event, a ticket with the network environment, each ticket further includes a representation of said network event, each ticket further includes a data store for storing a list of suggested response actions, wherein, for each ticket, when each correlation test of each correlation rule is applied to each representation of each network event, if the correlation test evaluates to TRUE, the associated list of suggested actions is added to the list of suggested response actions in the data store associated with the ticket, wherein the associated list of suggested response actions for all tickets are combined to form a unified list of suggested response actions.

30. The method of claim 29, wherein at least two correlation tests are applied concurrently.

* * * * *